United States Patent Office 3,379,648
Patented Apr. 23, 1968

3,379,648
SEPARATION OF TRIVALENT 4f RARE EARTHS FROM MOLTEN FLUORIDE COMPOSITIONS WITH $UF_3$
Harold F. McDuffie, Oak Ridge, Tenn., assignor to the United States of America as represented by the United States Atomic Energy Commission
No Drawing. Filed Dec. 7, 1966, Ser. No. 599,977
3 Claims. (Cl. 252—301.1)

ABSTRACT OF THE DISCLOSURE

Trivalent 4f rare earth fluorides are removed from molten fluoride by saturating the composition with $UF_3$ and collecting the resultant precipitated phase.

---

The invention described herein was made in the course of, or under, a contract with the United States Atomic Energy Commission.

Background of invention

This invention relates to a method for removing rare earth fission products from molten fluoride reactor fuel systems or from molten fluoride solutions containing dissolved rare earth fluorides.

In molten fluoride reactor fuel system designed for thermal breeding, it is essential to maintain maximum neutron economy in order to obtain a net breeding gain. This implies that the accumulation of fisson products having a high capture cross section for thermal neutrons must be reduced to a minimum. In this respect, the rare earth elements (atomic numbers 57–71) particularly samarium, europium, neodymium, and gadolinium are generally considered to account for more than 50% of the neutron absorption (i.e., poisoning), by non-gaseous elements. Neutron loss to these fission products must be kept low, and this should be done by, and it is an object of this invention to provide a method for, processing fissionable and fertile compositions on an economic, short batch, or preferably continuous cycle to remove rare earth fission product poisons from molten fluoride compositions.

Processes for the separation of rare earth fission product elements are known. They fall into three main classes. In one approach, a portion of the fluoride fuel is disengaged from a circulating fuel system, dissolved in aqueous acids, followed by solvent extraction purification. In another case, a portion of the fuel is fluorinated to form volatile fluorides. Vacuum distillation is employed to distill off fuel solvent fluorides such as LiF, $BeF_2$, and $ZrF_4$. The non-distilled residue contains the fission product poisons consisting principally of rare earths. Both of these processes are non-ideal because they involve disengagement of fuel, necessitating fuel make up. In addition, the disengaged fuel stream is subject to several operations which, while standard, are nevertheless costly and require that the fuel and solvent fluorides be reconstituted before they can be returned to the reactor.

A third approach involves displacement or replacement of high cross section rare earth poisons by the addition of large quantities of a lower cross section rare earth fluoride such as cerium fluoride. However, the cerium addition has been shown to raise the liquidus temperature of the molten fluoride salt by at least 30° while removing appreciable quantities of uranium as well as plutonium. What is needed, and what this invention provides, is a scheme for the reprocessing of molten fluoride fuel mixtures which selectively and rapidly removes rare earth fission posions without any essential disruption in the composition of other solute or solvent components of the mixture.

Summary of invention

The objects and advantages of the invention are realized from and based on the discovery that solid $UF_3$ can be used as an efficient and selective extractant for 4f trivalent fission product fluorides on an essentially continuous basis from molten fluoride fuel composition.

Description

In practice, $UF_3$ is added to a molten fluoride composition containing rare earth fission products in an amount at least sufficient to saturate the melt with $UF_3$; whereupon, a $UF_3$ precipitate is formed which includes a portion of the race earth fission products from the melt. Precipitation may be effected at constant temperature or by cooling the melt after $UF_3$ addition in order to decrease both rare earth fluoride and $UF_3$ solubility.

This invention can be practiced as a short cycle batch process or in a continuous manner. In a short cycle sequence, the fluoride melt is saturated in $UF_3$, cooled, and the resulting precipitate is collected and separated from the melt. This sequence is repeated until the desired reduction in fission rare earths has been effected. To practice the invention as a continuous process, the circulating molten fluoride composition in a main stream is simply forced through a porous horizontal or vertical column packed with solid $UF_3$ in a side stream until a desired rare earth decontamination factor is achieved.

This invention offers unique advantages as a short cycle or continuous process which removes high neutron capture cross section rare earth elements with essentially no contamination of the solution or disruption of the fuel system. The stability of $UF_3$ and its ability to effectively remove rare earths without removing adverse amounts of tetravalent uranium (as $UF_4$) from solution at temperatures up to about 875° C. is an especially significant advantage since it conserves the uranium fuel inventory.

In contrast to previous fuel reprocessing schemes, the solvent and solute compositions remain essentially constant except that rare earths have been removed and some slightly soluble $UF_3$ has been added. If the amount of dissolved $UF_3$ is regarded as excessive, it may be readily converted to $UF_4$ by oxidation, for example, by sparging with gaseous HF.

The effective use of $UF_3$ as a solid extractant for trivalent rare earth fluorides is essentially independent of the solvent or solute components in the fluoride melt. The composition of each may vary over wide limits. All that is required is that the $UF_3$ be present or be caused to crystallize or precipitate from solution. Nine typical fluoride compositions from which trivalent fluorides can be selectively removed by treatment with $UF_3$ are listed in Table I below in which the numbers refer to concentration of the indicated metal fluoride in mole percent.

TABLE I.—COMPOSITION

|         | I    | II   | III   | IV   | V    | VI   | VII | VIII | IX    |
|---------|------|------|-------|------|------|------|-----|------|-------|
| LiF     | 68.3 |      | 65    |      | 71   | 71   | 66  | 73   | 68    |
| $BeF_2$ | 31.2 |      | 29.17 |      | 20   | 2    | 34  |      | 31.75 |
| $UF_4$  | 0.5  | 4.0  | 0.83  | 28   | 0.25 |      |     | 27   |       |
| $ZrF_2$ |      | 40.7 | 5.0   |      |      |      |     |      |       |
| $ThF_4$ |      |      |       |      |      | 0.75 | 27  |      |       |
| $PuF_3$ |      |      |       |      |      |      |     |      | 0.25  |
| NaF     |      | 55.3 |       | 46   |      |      |     |      |       |
| KF      |      |      |       | 26   |      |      |     |      |       |

The following examples will show the efficacy of $UF_3$ in removing selected trivalent rare earth fluorides (atomic numbers 57–71) from molten fluoride compositions.

EXAMPLE I $UF_3$ was added in 30-gram increments to approximately 2.2 kilograms of solution VII that initially contained $10^{-4}$ mole fraction of $CeF_3$ with about 1 microcurie of $^{144}Ce$ as a radiotracer at a temperature of approximately 550° C. Filtered samples of the salt mixture were taken after each addition of $UF_3$ and analyzed radiochemically for Ce. The results are summarized in Table II below.

TABLE II

| Moles $UF_3$ | 0 | 0.1 | 0.2 | 0.3 | 0.4 | .63 | .52 |
|---|---|---|---|---|---|---|---|
| Ce Mole fraction×$10^{-4}$ | 1.14 | 1.02 | 0.90 | 0.74 | 0.5 | 00. | 0 3 |

In general, rare earth removal may be related to $U^{+3}$ concentration in solution by the equation:

$$ln N_{Re} = K ln N^{U+3} + constant$$

where $N_{Re} + N^{U+3}$ are mole fractions of rare earth and trivalent uranium, respectively. For the co-precipitation of $CeF_3$ a value of about 0.55 has been obtained.

EXAMPLE II

At a temperature of 550° C., a molten salt composition consisting of 1.1 kg. of solution VII and containing neodymium was mixed with portions of solid $UF_3$. After each addition of $UF_3$, the molten salt was filtered and the filtrate examine for its Nd content. The analytical results are given in Table III.

TABLE III

| $UF_3$ added (moles) | 0 | 0.1 | 0.4 | 0.6 | 0.8 | 1 |
|---|---|---|---|---|---|---|
| Nd in solution (mole fraction×$10^4$) | 1 | .93 | .68 | .6 | .31 | 0.2 |

EXAMPLE III 55 grams $LaF_3$ were added to approximately 3 kilograms of 66 mole percent LiF, 34 mole percent $BeF_2$ and 6 mole percent $ZrF_4$ which also contained 3 mole percent $UF_3$. The mixture was equilibrated at 850° C. The temperature was reduced in 50° C. intervals to 550° C. under equilibrium conditions. Filtered samples of the salt mixture were withdrawn after each reduction in temperature.

In a separate experiment the solubility of La in a salt of the same composition, without $UF_3$, was tested. The results are tabulated in Table IV below.

TABLE IV

| Temp.(°C.) | 850 | 800 | 700 | 650 | 600 | 550 |
|---|---|---|---|---|---|---|
| La solubility (moles) without $UF_3$ | 0.9 | .09 | .09 | .09 | .064 | 0.05 |
| La solubility with $UF_3$ | .068 | .052 | .024 | ---- | .018 | .013 |

These results show that the decrease in the solubility of $LaF_3$ as the combined function of temperature and $UF_3$ addition is significantly greater than decrease in solubility achieved by temperature alone.

EXAMPLE IV

A molten salt (solvent $LiF=BeF_2$ (66–34 mole percent)) containing 0.18 mole/kg. trivalent and 0.17 mole/kg. tetravalent uranium and trivalent samarium (.07 mole/kg. of melt) was equilibrated for a period of time at 850° C. and then cooled to 550° C. After equilibration at 550° C., the salt was filtered and the filtrate analyzed for samarium. It was found that the samarium content had been reduced to approximately .03 mole/kg. of melt. In a parallel experiment under the same conditions and concentrations except that the melt did not contain trivalent uranium, the final samarium concentration was found to be unchanged.

Having thus described my invention, I claim:

1. A method for separating 4f rare earth trifluorides from a molten fluoride composition which comprises adding $UF_3$ to said composition to form a saturated solution of $UF_3$, precipitating $UF_3$ from said solution, and separating the resulting precipitate.

2. The method according to claim 1 in which the $UF_3$ is added to the molten composition at a temperature below 875° C. and precipitation of said $UF_3$ is conducted at a temperature above the freezing point of the composition.

3. A method for separating 4f rare earth trifluorides from a molten fluoride composition which comprises passing said composition through a porous column of solid $UF_3$ until a desired level of rare earth decontamination has been effected.

No references cited.

CARL D. QUARFORTH, *Primary Examiner.*

L. DEWAYNE RUTLEDGE, *Examiner.*

M. J. SCOLNICK, *Assistant Examiner.*